Inventor:
Karl Kleine Weischede

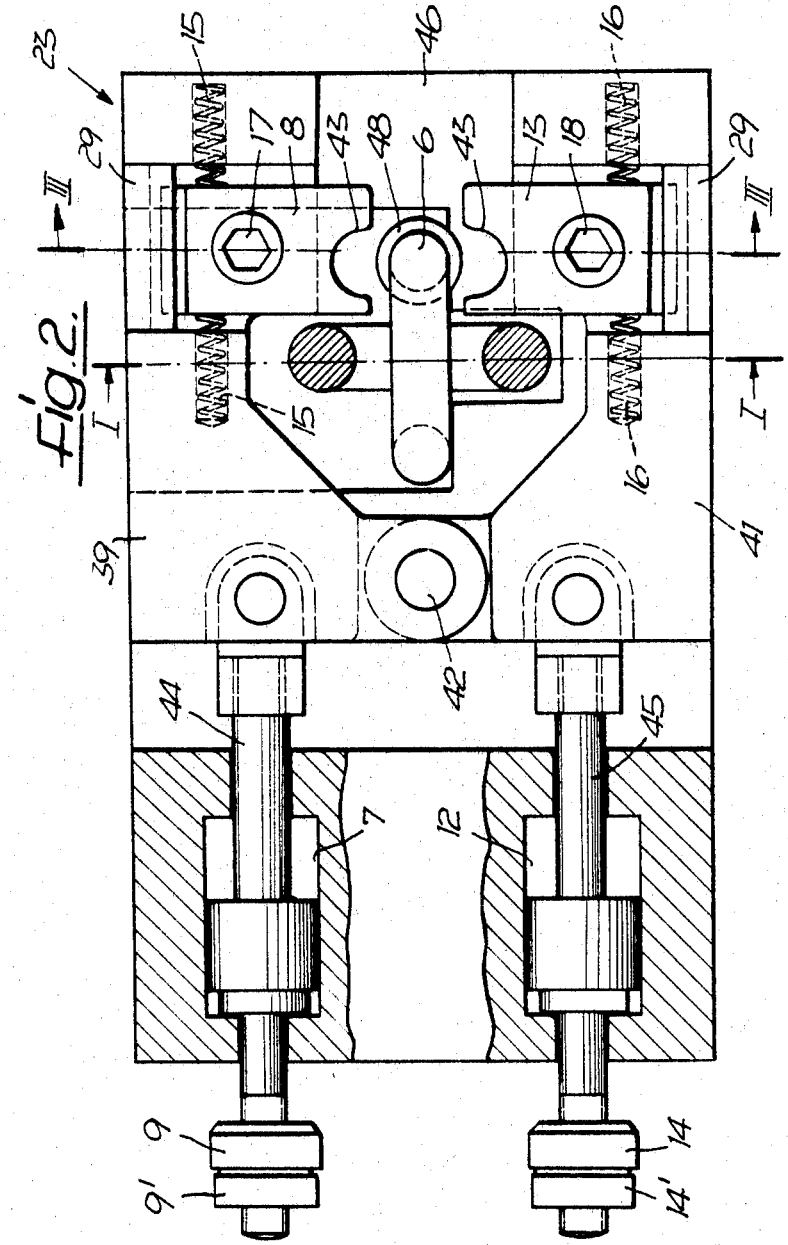

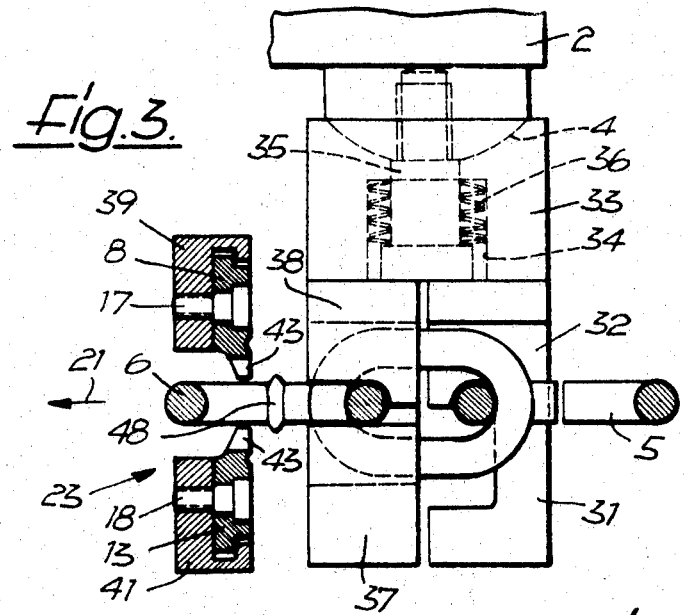
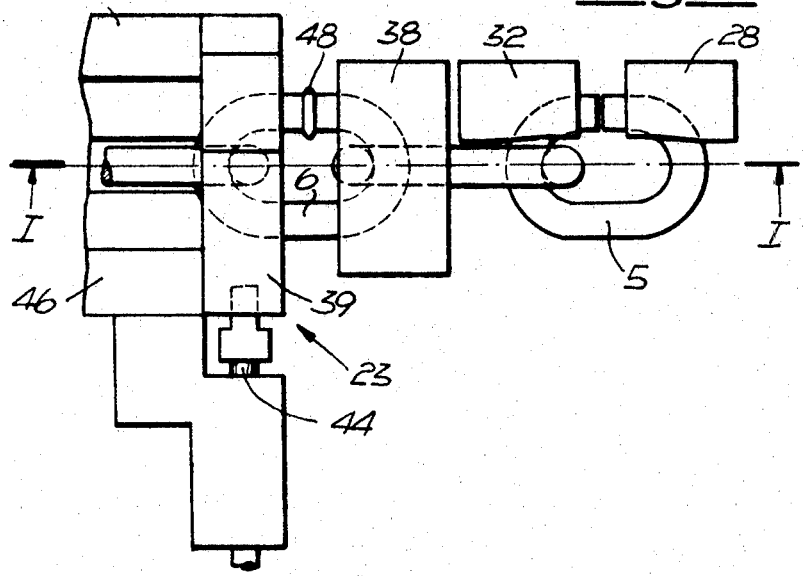

United States Patent Office 3,389,552
Patented June 25, 1968

3,389,552
AUTOMATIC CHAIN WELDING MACHINE
Karl Kleine-Weischede, Hauptstrasse 40,
Gersweiler-Saarbrucken, Germany
Filed June 10, 1966, Ser. No. 556,650
Claims priority, application Germany, June 15, 1965,
K 56,381
8 Claims. (Cl. 59—16)

The present invention relates to an automatic chain welding machine for welding together the two ends of each open link of a round-link chain which connects two other links of this chain to each other, wherein this chain is fed in a step-by-step movement in one direction and while the feeding movement is interrupted, the two ends of the link are first welded together and the weld bead is then trimmed off. This machine comprises clamping means for holding the round links in a fixed position during the welding operation and during the trimming operation and it further comprises electrodes for supplying the electric welding current to each link to be welded and an upsetting slide for pressing the two ends of this link against each other at least during a part of the welding operation.

The automatic chain welding machines of the above-mentioned type which were known prior to this invention have the disadvantage that the weld bead of each welded link is removed in the same position in which the link is welded and subsequent to the welding operation thereon while the feeding movement of the chain is stopped. Consequently, the length of time of stopping the feeding movement of the chain through the machine and thus the total length of time required for producing the chain are increased by the length of time which is required for the trimming operations on all of the chain links.

It is an object of the present invention to provide an automatic chain welding machine which is designed so as to avoid this loss of time as caused by the trimming operation and therefore permits a round-link chain to be produced at a considerably greater speed. This object is attained according to the invention by designing the machine so that a separate trimming station is provided which is located immediately behind the welding station, as seen in the feeding direction of the chain, by simultaneously welding one chain link in the welding station and trimming another previously welded chain link in the trimming station, and by carrying out both operations of welding one link and trimming another link during the length of time which is merely required for the welding operation. Since the trimming station of the machine is located directly behind the welding station, as seen in the feeding direction of the chain, the link which has just been welded still has such a high temperature when it is moved to the trimming station that the weld bead may be trimmed off very easily.

Another feature of the invention consists in providing separate clamping devices for the welding and trimming stations, but a common drive for operating both clamping devices simultaneously. Since the adjacent links which are to be welded and trimmed will thus be clamped simultaneously in a fixed position, they may also be welded and trimmed simultaneously. Since for both operations it is only necessary to stop the feeding movement of the chain merely for the length of time of the welding operation, no time will be lost for also carrying out the trimming operation. The automatic chain welding machine according to the invention therefore permits a round link chain to be produced within the shortest possible length of time.

Another feature of the invention consists in providing a common clamping element for the round links which are located within the welding station and the trimming station and in pivotably connecting this clamping element to the adjusting device thereof so that the clamping element will automatically adapt itself to the shape and position of the two links to be welded and trimmed. This permits the entire drive for the clamping devices of the welding and trimming stations to be made of a very simple and inexpensive construction which insures that the two links which are to be welded and trimmed will be clamped and worked upon simultaneously.

This pivotable connection between the common clamping element and the adjusting element for moving the same is preferably provided in the form of corresponding spherical surfaces on the sides of both elements which engage with each other. Such spherical surfaces permit the clamping element to swivel automatically in all directions and the pressure to be transmitted from the adjusting device to this clamping element regardless of the angle to which the clamping element is swiveled.

Another important feature of the invention consists in pivotably mounting the trimming blades which are provided in the trimming station. This has the advantage that the trimming blades will adapt themselves automatically to the particular width of the chain link which is clamped in the trimming station and also to the position of the clamped link when inaccurately centered relative to the trimming blades.

The features and advantages of the present invention will become further apparent from the following detailed description thereof which is to be read with reference to the accompanying diagrammatically simplified drawings, in which—

FIG. 2 shows, partly in section, a view of the trimming mechanism of the machine, as seen in the direction of the arrow II in FIG. 1;

FIG. 3 shows a part of the side view according to FIG. 1 on an enlarged scale and partly in the form of a cross section which is taken along the line III—III in FIG. 2; while FIG. 4 shows a diagrammatically very simplified top view of the welding station and a part of the trimming station according to FIGS. 1 to 3.

Figure 1:
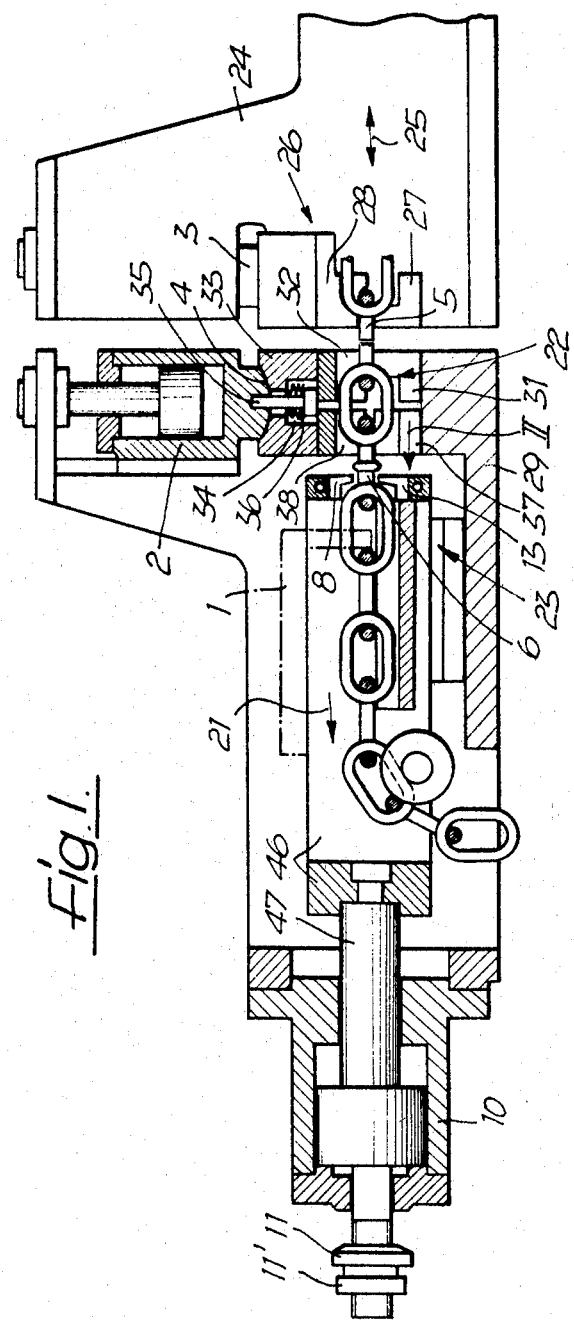
FIG. 1 shows a side view of the welding and trimming stations of an automatic chain welding machine according to the invention, this view being partly shown in the form of a cross section which is taken along the lines I—I of FIGS. 2 and 4.

As illustrated in the drawings, the automatic chain welding machine according to the invention for welding together the two ends of each of the open alternate links 5 of a round-link chain is provided with a feeding mechanism, as merely indicated in FIG. 1 in dot-and-dash lines by a feed arm 1, which feeds the round-link chain in a step-by-step movement in the direction of the arrow 21 through a welding station, as generally indicated by the numeral 22, and through a trimming station, as generally indicated by the numeral 23.

The welding station 22 is provided with an upsetting slide 24 which is moved back and forth in the direction of the arrow 25 by hydraulic, pneumatic or mechanical means, not shown. This upsetting slide 24 carries a clamping mechanism 26 for tightly clamping the right rear end of each round link 5 to be welded lies within a horizontal plane. The clamping mechanism is for this purpose provided with a movable clamping jaw 28 which is operatively associated with a relatively fixed clamping jaw 27 and adapted to be moved upwardly and downwardly by the operation of a clamping cylinder 3. The fixed jaw 27 is also designed so as to serve as an electrode for supplying the electric current to the link 5 for carrying out the welding operation.

Closely adjacent to the upsetting slide 24 which is movable in the direction of the arrow 25 within a machine housing, not shown, the welding machine further comprises a stationary support 29 which is rigidly connected to the machine housing and carries a fixed clamping jaw 31 which forms a part of a second clamping mechanism and also serves as the second electrode of the welding station. This fixed jaw 31 is operatively associated with a movable clamping jaw 32 for clamping the right front end of the chain link 5 which is to be welded. This clamping jaw 32 is rigidly secured to an intermediate element 33 which has a spherical surface 4 engaging upon a corresponding spherical surface on a clamping cylinder 2 which is movable upwardly and downwardly relative to its fixed piston within the machine housing. For connecting the intermediate element 31 to the clamping cylinder 2 so as to be pivotable along the spherical surface 4, the intermediate element 33 is provided with a chamber 34 containing a screw 35 which is screwed into a threaded bore in the clamping cylinder 2 and is acted upon by a spring 36 which rests on the bottom of chamber 34.

Immediately adjacent to the lower fixed jaw 31 the support 29 carries another fixed jaw 37 of a clamping device of the trimming station 23 which by means of a movable clamping jaw 38 on the intermediate element 33 permits the right as well as the left rear parts of the chain link 6 as seen in the feeding direction of the chain to be clamped in a fixed position for the trimming operation of removing the weld bead which has been formed by the preceding welding operation. The two clamping devices comprising the clamping jaw 32 of the welding station and the clamping jaw 38 of the trimming station therefore have a common drive which is formed by the clamping cylinder 2, and by means of their connection to the intermediate element 33 the two clamping devices are combined so as to form a common clamping element which is pivotably connected to its adjusting element, namely, the clamping cylinder 2.

The trimming station 23 is further provided with two trimming blades 8 and 13, each of which is pivotably connected by a bolt 17 or 18 to an angular lever 39 or 41, respectively. Both of these levers 39 and 41 are pivotable independently of each other about a common axis 42. The trimming blades 8 and 13 are held in a central position relative to the angular levers 39 by springs 15 and 16. For encompassing the round link 6, the cutting edges 43 of blades 8 and 13 are provided with semicircular recesses of such a depth that when the blades 8 and 13 are alternately applied upon the link 6, the cutting edge of each blade will extend beyond the horizontal central plane of the link.

Each of the angular levers 39 and 41 is acted upon by a piston rod 44 or 45 which is slidable within a cylinder 7 or 12, respectively. These piston rods 44 and 45 also project from the left ends of cylinders 7 and 12, as seen in FIG. 2, and carry thereon adjustable stop nuts 9 and 14 which may be locked in the adjusted position by lock nuts 9' and 14' and serve for limiting the trimming position of the trimming blades 8 and 13.

The trimming blades 8 and 13 together with their angular levers 39 and 41 and the cylinders 7 and 12 are mounted within a frame 46 which is slidable back and forth on the support 29 in the direction of the double arrow 25 and is acted upon by the piston rod 47 of a trimming piston which is slidable within a cylinder 10. At the other side of the trimming piston, piston rod 47 extends from cylinder 10 and carries a stop nut 11 and a lock nut 11' for the latter.

The mode of operation of the automatic chain welding machine as illustrated in the drawings is as follows:

For welding each round link 5 which connects two adjacent solid rings, the clamping cylinders 2 and 3 are operated simultaneously so that the link 5 to be welded will be clamped by both clamping jaws 28 and 32. At the same time, the rear end of a link 6 which has just been welded and from which the weld bead is to be trimmed is clamped by the clamping jaw 38. Since the intermediate element 33 is pivotably mounted, it will adjust itself automatically so that both links 5 and 6 will be clamped securely. When the welding current is then switched on, a pressure medium will be passed into the cylinder 7 so that the upper trimming blade 8 will be moved to the trimming position which is limited by the stop nut 9. Thereafter the trimming cylinder 10 is operated so that the trimming blade 8 will cut off the upper half of the weld bead 48 on link 6. The pistons in cylinders 7 and 10 are thereafter returned to their original positions so that the trimming blade 8 and frame 46 will be returned to the position as illustrated. Cylinder 12 of the lower trimming blade 13 is then operated so that the latter will be moved to its trimming position. The trimming cylinder 10 is then again operated so that the lower half of the weld bead 48 will also be cut off. The surface of the chain link 6 will then be completely smooth. The pistons in cylinders 12 and 10 are then again returned to their original positions and the trimming mechanism is then again in its starting position as illustrated in the drawings.

As soon as the welding operation is completed, the clamping jaws 28, 32, and 38 and the upsetting slide 24 will be returned to their inactive positions and the chain will be moved one step further by the feed arm 1 so that the link 5 which has just been welded will be moved to the trimming station where its weld bead 48 will be trimmed off during the welding operation on the next chain link.

Since the trimming blades 8 and 13 are pivotable about the bolts 17 and 18, they can adapt themselves automatically to variations in width of the round links 6 to be trimmed and also to an inaccurately centered position of these links when they are clamped in the trimming station. The cutting forces of trimming blades 8 and 13 are taken up by bolts 17 and 18 and by crossbars 29 which are provided within the angular levers 39 and 41 for guiding the trimming blades 8 and 13.

In place of the spherical surfaces 41 and a common drive it is, of course, also possible to provide two separate drives for the clamping devices of the welding station and the trimming station, for example, in the form of two separate cylinders which are operated simultaneously.

The machine may also be modified so that the trimming blades will not be operated by pivotable angular levers as previously described, but by moving these blades in a straight direction relative to each other. It is, however, also in this case advisable to mount the trimming blades so as to be pivotable to enable them to adjust themselves to the width of the chain link 6 or to the particular position thereof.

For driving the machine according to the invention, it is possible to employ either hydraulic, pneumatic or mechanical means or a combination of such means.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In an automatic chain welding machine for welding together the two ends of each open link of a round-link chain connecting two other links of said chain to each other, wherein said chain is fed in a step-by-step movement in one direction and, while the feeding movement is interrupted, the two ends of each link to be welded are first welded together and the weld bead is then trimmed off, and wherein said machine comprises clamping means for holding the link to be welded in a fixed position during the welding operation and during the trimming operation, electrodes for supplying an electric welding current to said link, and an upsetting slide for pressing the two ends of said link against each other at least during a part of the welding operation, the improvement comprising two separate stations located behind each other in the feeding direction of said chain and including means in the first of said stations for welding together the ends of a first of said open links, and means in the second station for trimming the weld bead off a second previously welded link simultaneously with the welding of said first link.

2. An automatic chain welding machine as defined in claim 1, wherein said second trimming station is located immediately behind said first welding station so that when one of said links has been welded in said first station and is then moved to said second station, said link will still be so hot from the welding operation that the weld bead may be easily trimmed off said link during the period in which the next open link is welded in said first station.

3. An automatic chain welding machine as defined in claim 1, in which said means in said first and second stations comprise clamping means for holding said two links in a stationary position during the welding and trimming operations, and means for operating said clamping means simultaneously.

4. An automatic chain welding machine as defined in claim 3, in which said clamping means of said first and second stations comprise a single clamping device, means for reciprocating said clamping device between a released position and a clamping position, and means for pivotably connecting said clamping device to said reciprocating means.

5. An automatic chain welding machine as defined in claim 4, in which said connecting means comprise associated spherical surfaces engaging with each other on said reciprocating means and said clamping device.

6. An automatic chain welding machine as defined in claim 1, in which said means in said second station comprise a pair of trimming blades, actuating means for moving said trimming blades into engagement with said link, and means for pivotably connecting said trimming blades to said actuating means.

7. An automatic chain welding machine as defined in claim 6, further comprising means for moving said trimming blades in a longitudinal direction along the welded link to be trimmed for shearing off said weld bead on said link during the period in which the next link is welded.

8. An automatic chain welding machine as defined in claim 1, in which said means in said first and second stations comprise two movable clamping jaws, for clamping the link to be welded and the link to be trimmed, respectively, and means for moving said clamping jaws for simultaneously clamping said two links.

References Cited

UNITED STATES PATENTS

| | | | |
|---|---|---|---|
| 2,358,197 | 9/1944 | Winter | 59—29 |
| 2,806,345 | 9/1957 | Phares | 59—29 |
| 2,824,420 | 2/1958 | Esser | 59—29 |
| 3,096,612 | 7/1963 | Coffey | 59—29 |

CHARLES W. LANHAM, *Primary Examiner.*

G. P. CROSBY, *Assistant Examiner.*